(12) United States Patent
Tan et al.

(10) Patent No.: US 10,236,674 B2
(45) Date of Patent: Mar. 19, 2019

(54) INSULATION TERMINATION ASSEMBLY

(71) Applicant: Tyco Electronics (Shanghai) Co. Ltd., Shanghai (CN)

(72) Inventors: Yuezhong Tan, Shanghai (CN); Lizhang Yang, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/950,674

(22) Filed: Apr. 11, 2018

(65) Prior Publication Data

US 2018/0233894 A1    Aug. 16, 2018

Related U.S. Application Data

(63) Continuation of application No. PCT/IB2016/055103, filed on Aug. 26, 2016.

(30) Foreign Application Priority Data

Aug. 27, 2015 (CN) .......................... 2015 1 0534309

(51) Int. Cl.
*H02G 15/32* (2006.01)
*H02G 15/068* (2006.01)
(Continued)

(52) U.S. Cl.
CPC ........... *H02G 15/32* (2013.01); *H02G 15/068* (2013.01); *H02G 15/23* (2013.01); *H02G 15/30* (2013.01); *H01R 4/183* (2013.01)

(58) Field of Classification Search
CPC ......... H02G 15/32; H02G 15/30; H01R 4/183
(Continued)

(56) References Cited

U.S. PATENT DOCUMENTS 3,300,570 A * 1/1967 Spiece .................. H01B 17/28
174/18
3,716,652 A * 2/1973 Lusk .................... H01B 17/005
174/15.3
(Continued)

FOREIGN PATENT DOCUMENTS

CN    202816510 U    3/2013
CN    103219688 A    7/2013
(Continued)

OTHER PUBLICATIONS

PCT Notification of Transmittal of the International Search Report and the Written Opinion of the International Searching Authority, or the Declaration, International Search Report and Written Opinion of the International Searching Authority, dated Nov. 11, 2016, 11 pages.

(Continued)

*Primary Examiner* — Michael F McAllister
(74) *Attorney, Agent, or Firm* — Barley Snyder

(57) ABSTRACT

An insulation termination assembly comprises an insulation tube, an annular bottom plate, and a tail assembly. The insulation tube has an inlet end, an outlet end opposite to the inlet end, and an inner space filled with an insulation liquid. The annular bottom plate is mounted at the inlet end of the insulation tube. The tail assembly comprises an insulation connection tube mounted on the annular bottom plate and a shield tail tube connected to the insulation connection tube. A cable joint of a cable is introduced into the inner space of the insulation tube from the inlet end of the insulation tube after passing through the shield tail tube and the insulation connection tube.

20 Claims, 6 Drawing Sheets

(51) Int. Cl.
*H02G 15/30* (2006.01)
*H02G 15/23* (2006.01)
*H01R 4/18* (2006.01)

(58) Field of Classification Search
USPC .......................................................... 174/37
See application file for complete search history.

(56) References Cited

U.S. PATENT DOCUMENTS

| | | | | |
|---|---|---|---|---|
| 3,878,313 | A * | 4/1975 | Varner | H02G 15/06 174/19 |
| 4,851,955 | A * | 7/1989 | Doone | H01C 7/12 361/117 |
| 5,210,676 | A * | 5/1993 | Mashikian | H01C 7/12 361/117 |
| 6,265,663 | B1 * | 7/2001 | Cicogna | H02G 15/06 174/73.1 |
| 8,319,101 | B2 * | 11/2012 | Adachi | H02G 15/064 174/137 R |
| 9,748,722 | B2 * | 8/2017 | Quaggia | H02G 15/06 |
| 2003/0022556 | A1 * | 1/2003 | Amerpohl | H02G 15/06 439/620.01 |
| 2013/0078836 | A1 * | 3/2013 | Li | H02G 15/068 439/198 |
| 2014/0076624 | A1 * | 3/2014 | Bohlin | H02G 15/046 174/40 R |
| 2014/0182878 | A1 * | 7/2014 | Quaggia | H02G 15/06 174/73.1 |

FOREIGN PATENT DOCUMENTS

| | | |
|---|---|---|
| CN | 205070381 U | 3/2016 |
| GB | 1195524 | 6/1970 |
| JP | 201016986 A | 1/2010 |
| WO | 2006015735 A1 | 2/2006 |

OTHER PUBLICATIONS

Abstract of JP2010016986, dated Jan. 21, 2010, 1 page.
Chinese First Office Action, dated Sep. 11, 2017, 7 pages.
Abstract of CN205070381, dated Mar. 2, 2016, 1 page.

* cited by examiner

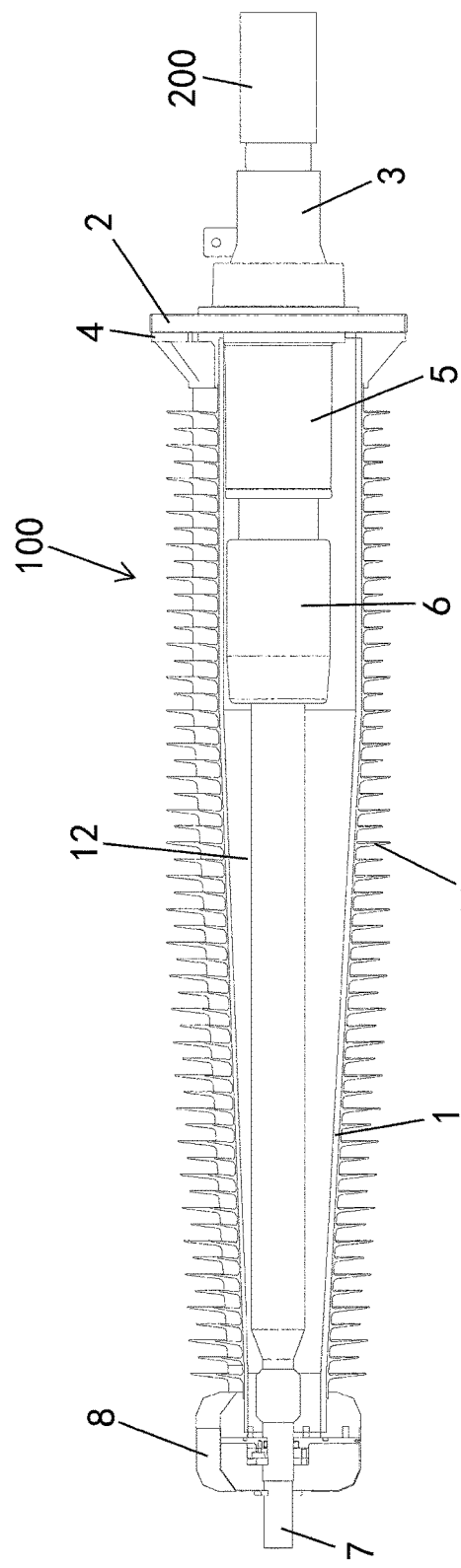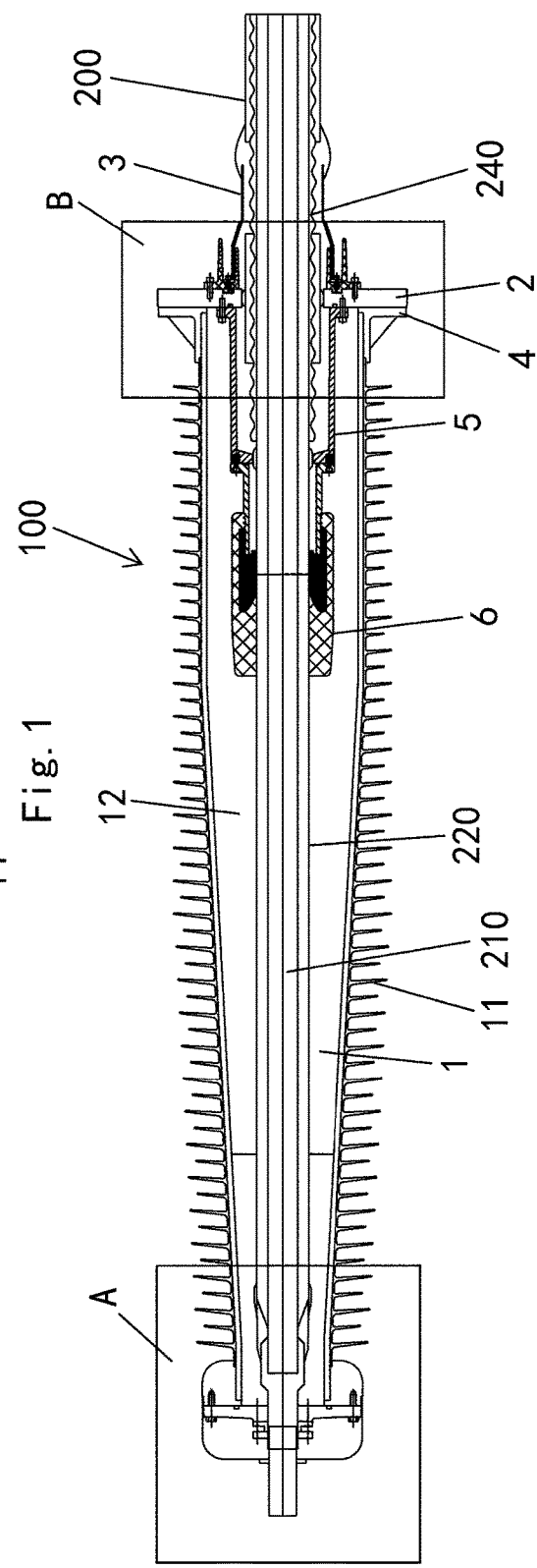

INSULATION TERMINATION ASSEMBLY

CROSS-REFERENCE TO RELATED APPLICATIONS

This application is a continuation of PCT International Application No. PCT/IB2016/055103, filed on Aug. 26, 2016, which claims priority under 35 U.S.C. § 119 to Chinese Patent Application No. 201510534309.3, filed on Aug. 27, 2015.

FIELD OF THE INVENTION

The present invention relates to an insulation termination assembly and, more particularly, to an insulation termination assembly for a conductor.

BACKGROUND

In a high-voltage or ultra-high voltage cable connection system, such as a connection system with a voltage level of 66 KV or more, it is necessary to install an insulation termination assembly on a joint of the cable to electrically connect, for example, a high voltage cable and an overhead line. The insulation termination assembly generally comprises an insulation tube, an insulation umbrella skirt, a metal flange, and a conductive rod led out of an end of the insulation tube. The insulation tube is filled with an insulation oil. The cable is partly stripped at a connection end thereof to form a cable joint. The cable joint is received in the insulation tube. The insulation umbrella skirt is formed on an outer wall of the insulation tube. The metal flange is attached to a base of the insulation tube.

A plurality of support insulators are commonly pre-installed on the metal flange. The support insulators increase the size of the metal flange and complicate the structure of the insulation termination assembly, increasing the cost of the metal flange and the cost of the insulation termination assembly as a whole.

SUMMARY

An insulation termination assembly comprises an insulation tube, an annular bottom plate, and a tail assembly. The insulation tube has an inlet end, an outlet end opposite to the inlet end, and an inner space filled with an insulation liquid. The annular bottom plate is mounted at the inlet end of the insulation tube. The tail assembly comprises an insulation connection tube mounted on the annular bottom plate and a shield tail tube connected to the insulation connection tube. A cable joint of a cable is introduced into the inner space of the insulation tube from the inlet end of the insulation tube after passing through the shield tail tube and the insulation connection tube.

BRIEF DESCRIPTION OF THE DRAWINGS

The invention will now be described by way of example with reference to the accompanying Figures, of which:

FIG. 1 is a sectional side view of an insulation termination assembly;

FIG. 2 is another sectional side view of the insulation termination assembly;

DETAILED DESCRIPTION OF THE EMBODIMENT(S)

Figure 3:
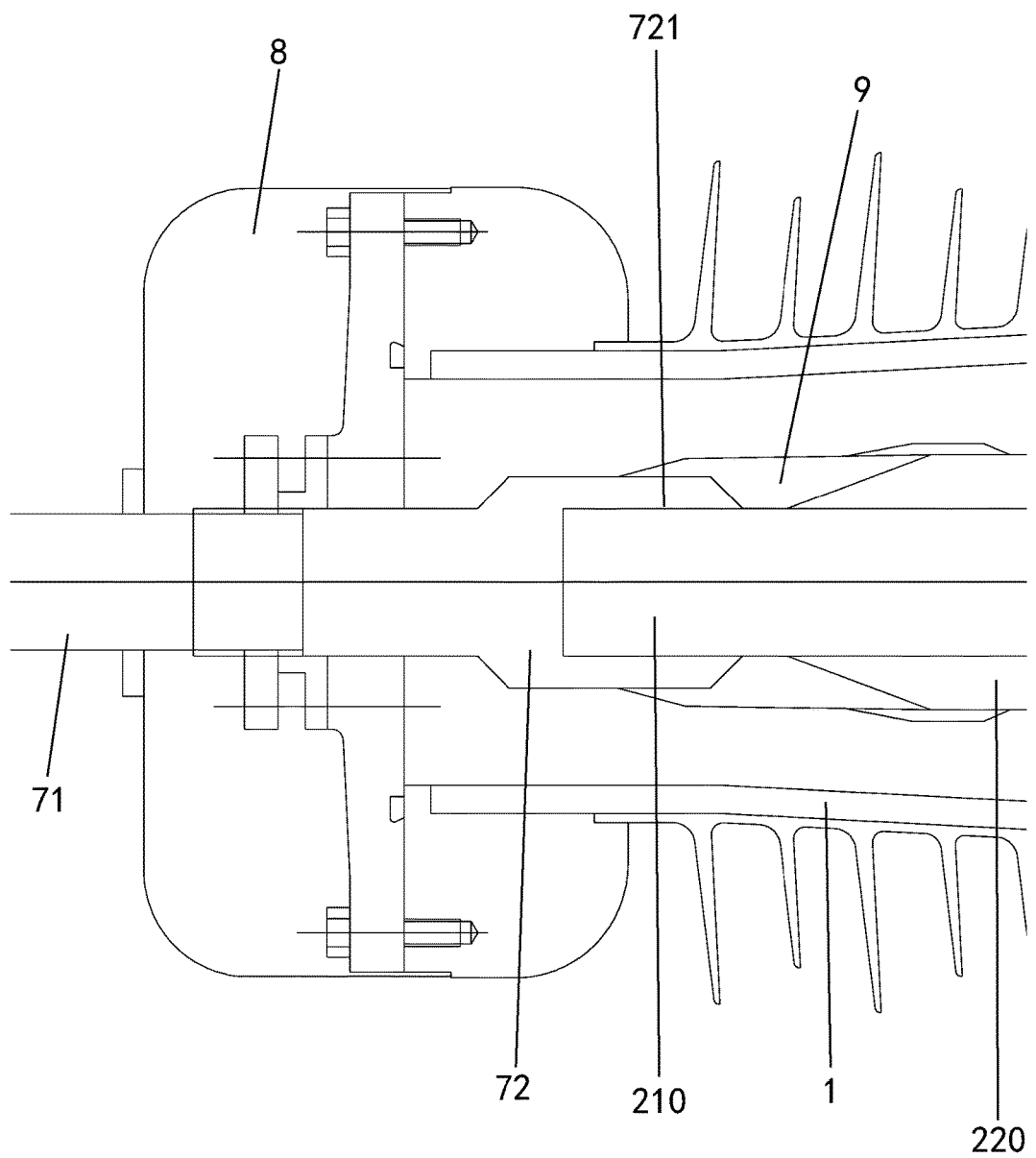
FIG. 3 is an enlarged view of a portion A in FIG. 2.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

An insulation termination assembly 100 according to an embodiment is shown in FIGS. 1 and 2. The insulation termination assembly 100, in an embodiment, is used to electrically connect a high-voltage or ultra-high voltage cable 200, for example, with a voltage level of 66 KV or more, to another high voltage cable or an overhead line. The insulation termination assembly 100 comprises an insulation tube 1, an annular bottom plate 2 mounted at an inlet end of the insulation tube 1, and a tail assembly 3.

The insulation tube 1, as shown in FIGS. 1 and 2, has an inlet end (a right end in FIGS. 1 and 2) and an outlet end (a left end in FIGS. 1 and 2) opposite the inlet end. A plurality of insulation umbrella skirts 11 are formed on an outer wall of the insulation tube 1. An inner space 12 of the insulation tube 1 is filled with insulation liquid. In an embodiment, the insulation liquid is an insulation oil. A cable joint of the cable 200 is introduced into the inner space 12 of the insulation tube 1 from the inlet end of the insulation tube 1.

Figure 4:
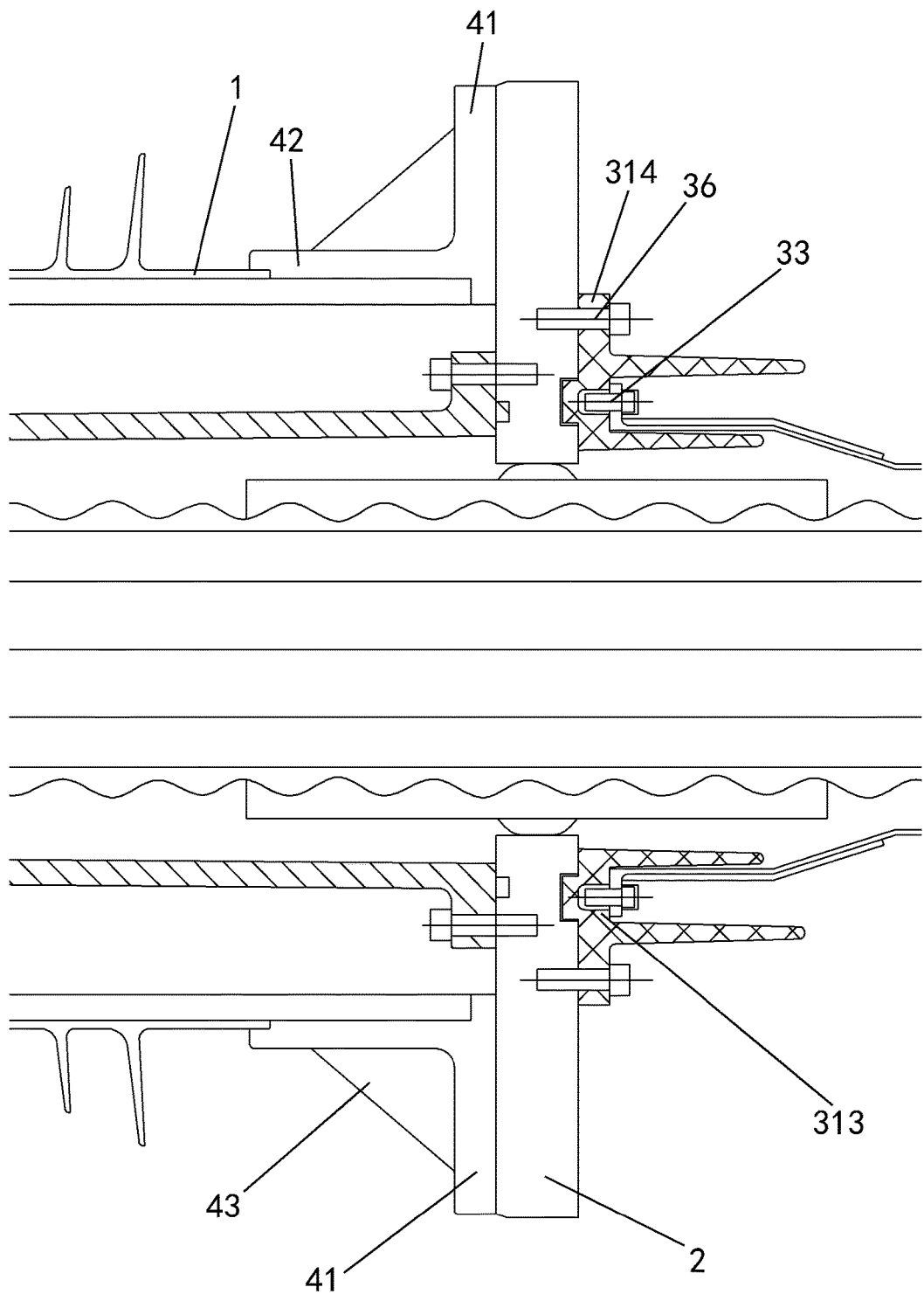
FIG. 4 is an enlarged view of a portion B in FIG. 2.
Figure 5:
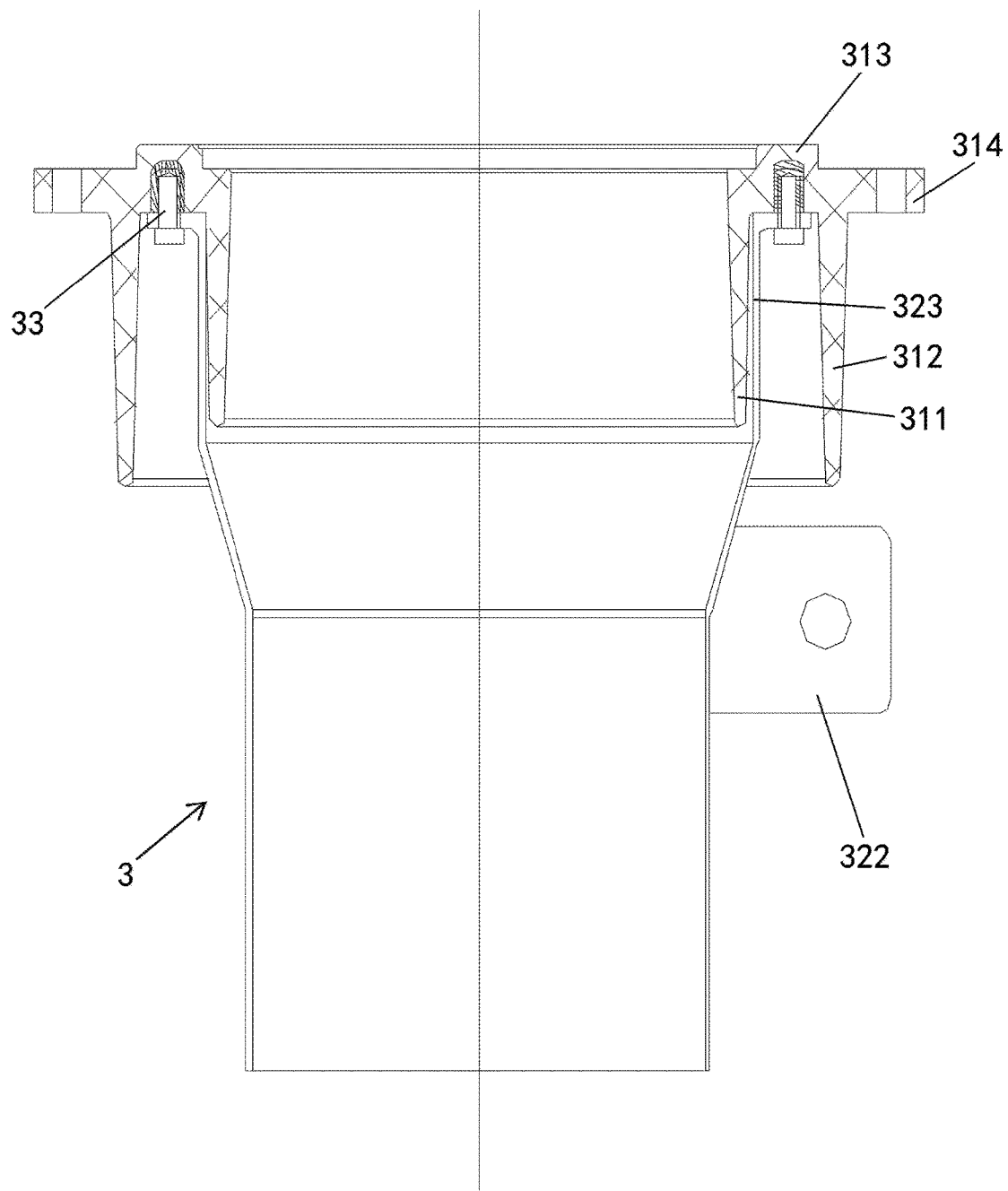
FIG. 5 is a sectional plan view of a tail assembly of the insulation termination assembly.

The tail assembly 3, as shown in FIGS. 4-6, comprises an insulation connection tube 31 mounted on the annular bottom plate 2 and a shield tail tube 32 communicated with the insulation connection tube 31. The cable joint of the cable 200 extending out of an electrical apparatus is introduced into the inner space 12 of the insulation tube 1 from the inlet end of the insulation tube 1 after passing through the shield tail tube 32 and the insulation connection tube 31. The cable 200 introduced into the insulation tube 1 is electrically shielded by the shield tail tube 32 and the shield tail tube 32 is electrically isolated from the annular bottom plate 2 made of metal by the insulation connection tube 31. The single tail assembly 3 serves as a support insulator to simplify the structure, permit a reduction in the size of the annular bottom plate 2, and reduce the cost of the insulation termination assembly 100.

Figure 6A:
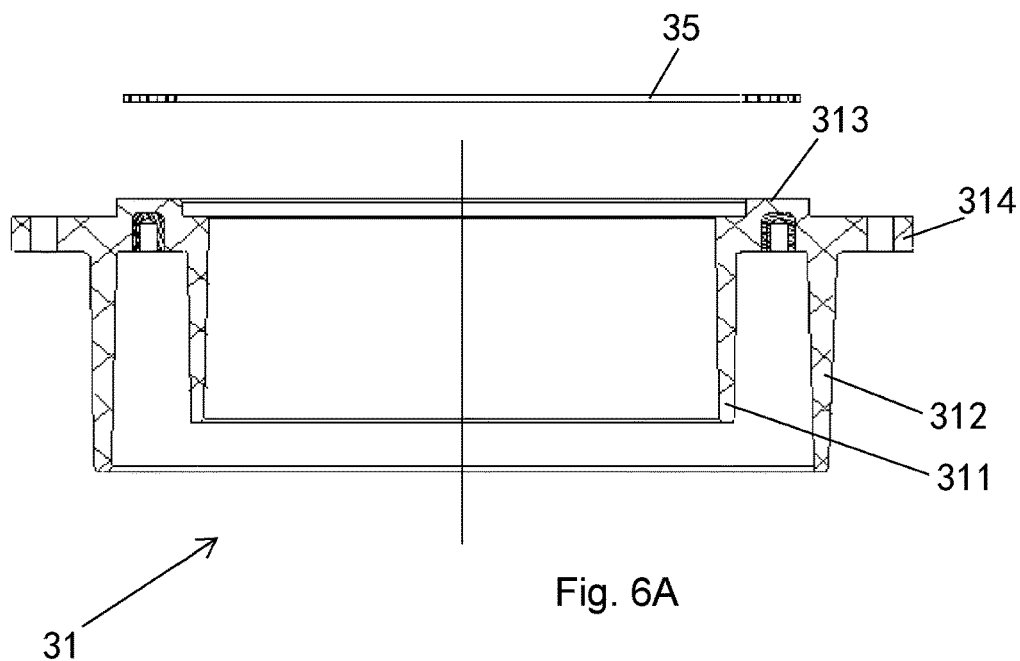
FIGS. 6(A) and 6(B) are exploded sectional plan views of the tail assembly of FIG. 5.
Figure 6B:
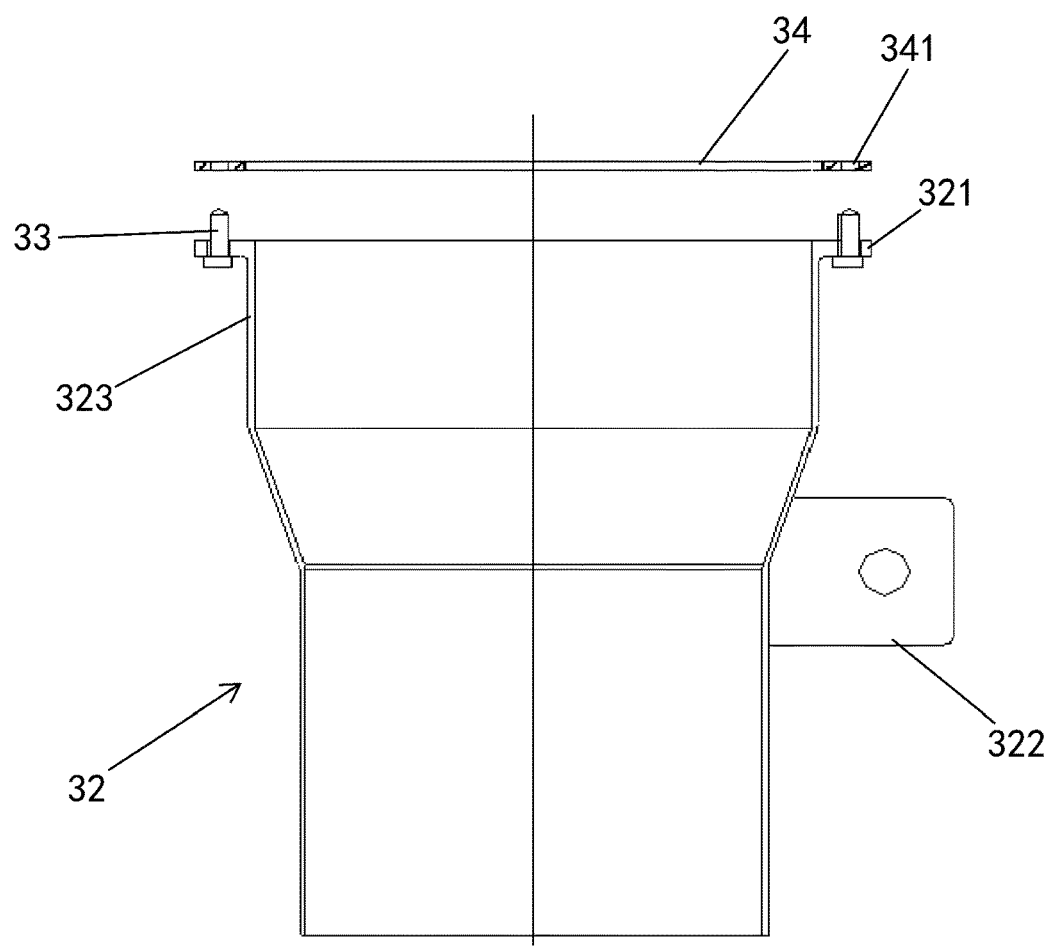

As shown in FIGS. 5, 6(A) and 6(B), the insulation connection tube 31 has an inner tube 311, an outer tube 312 provided outside the inner tube 311, and a connection part 313 connected between the inner tube 311 and the outer tube 312 at ends of the inner tube 311 and the outer tube 312. An installation end 323, the upper end in FIG. 6(B), of the shield tail tube 32 passes through a gap between the inner tube 311 and the outer tube 312 and is connected to the connection part 313. A portion of the shield tail tube 32 is thus sandwiched between the inner tube 311 and the outer tube 312, improving the insulation effect of the shield tail tube 32.

A first installation flange 321 radially protruding outward is disposed on the installation end 323 of the shield tail tube 32 as shown in FIG. 6(B). The shield tail tube 32 is mounted to the connection part 313 by a plurality of first connection pieces 33, for example, bolts or other fasteners known to those with ordinary skill in the art, each passing through one of a plurality of installation holes formed in the first installation flange 321. A first seal pad 34 is disposed between the installation end 323 and the connection part 313 to seal between the insulation connection tube 31 and the shield tail tube 32. The first connection pieces 33 pass through a plurality of through holes 341 formed in the first seal pad 34 and mount the shield tail tube 32 on the connection part 313.

The connection part 313, as shown in FIGS. 4-6(B), radially protrudes outward beyond the outer tube 312 to form a second installation flange 314. The second installation flange 314 is mounted on the annular bottom plate 2 by a plurality of second connection pieces 36, for example, bolts or other fasteners known to those with ordinary skill in the art, so as to mount the whole tail assembly 3 on the inlet end of the insulation tube 1 at the annular bottom plate 2. Assembly of the insulating connection tube 31 and the shield tail tube 32 may be completed in factory; in the field it is only necessary to connect the insulation connection tube 31 to the annular bottom plate 2, simplifying the installation of the insulation termination assembly 100 in the field.

A second seal pad 35, shown in FIG. 6(A), is disposed between the second installation flange 314 or the connection part 313 and the annular bottom plate 2. In an embodiment, an annular protrusion is formed on the connection part 313 and a slot for mating with the annular protrusion is formed in the annular bottom plate 2. In an embodiment, the second seal pad 35 and the annular protrusion are both engaged in the slot to improve the sealing between the second installation flange 314 and the annular bottom plate 2.

The shield tail tube 3, as shown in FIG. 5, has a grounding part 322 used for connecting a grounding wire. The whole insulation termination assembly 100 may be grounded via the grounding part 322.

The insulation termination assembly 100, as shown in FIGS. 1, 2, and 4, further comprises a connection base 4 mounted at the inlet end of the insulation tube 1. The annular bottom plate 2 is mounted on the bottom of the connection base 4.

In an embodiment, the connection base 4 is formed from a single piece of metal. The connection base 4, as shown in FIG. 4, comprises a third installation flange 41 and an auxiliary insulation tube 42 which are formed into a single piece. The third installation flange 41 is formed on the base of the auxiliary insulation tube 42. The auxiliary insulation tube 42 is connected to the inlet end of the insulation tube 1 and a portion of the inlet end of the insulation tube 1 is inserted into the auxiliary insulation tube 42.

The connection base 4, as shown in FIG. 4, has a plurality of insulation reinforcing ribs 43 integrally formed with the third installation flange 41 and the auxiliary insulation tube 42. The insulation reinforcing ribs 43 are each connected to a surface of the third installation flange 41 and an outer wall of the auxiliary insulation tube 42 to increase the connection strength between the third installation flange 41 and the auxiliary insulation tube 42. The insulation reinforcing ribs 43 are evenly spaced and arranged around the base of the auxiliary insulation tube 42.

Figure 7:
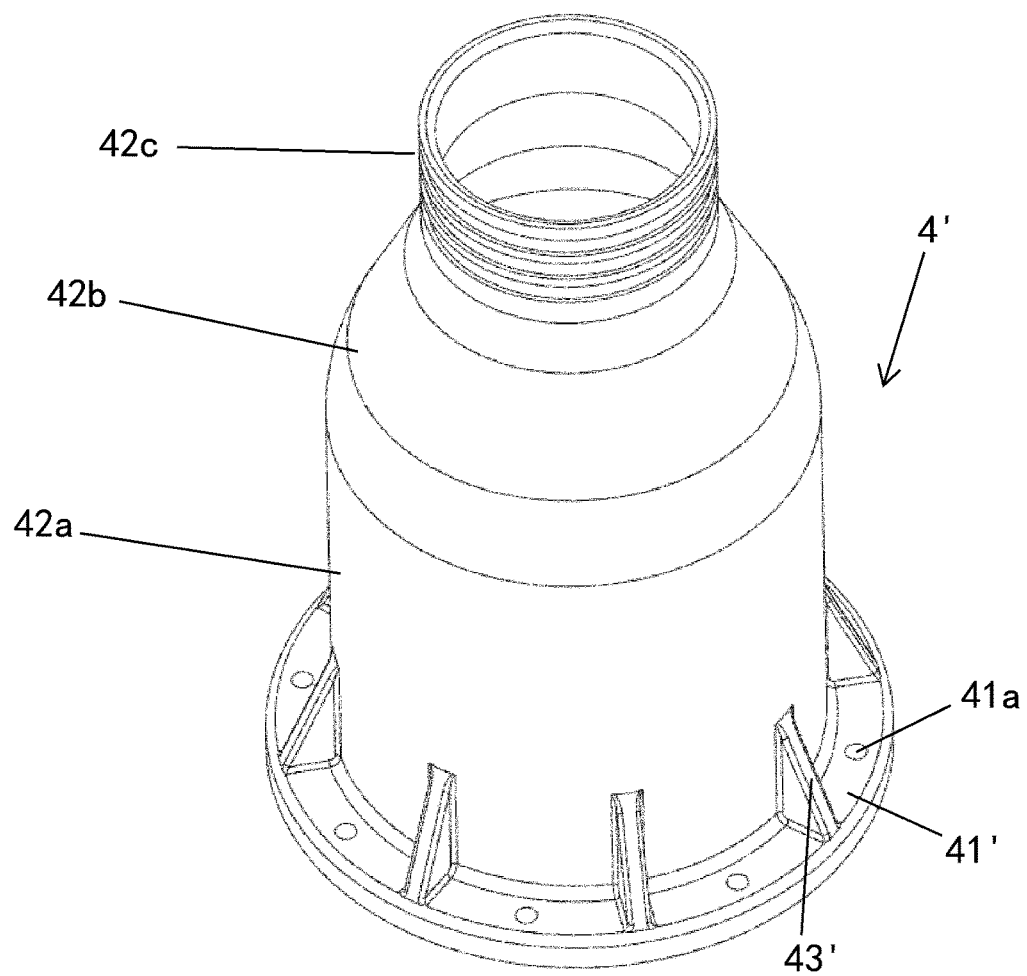
FIG. 7 is a perspective view of a connection base of an insulation termination assembly according to another embodiment.

A connection base 4' according to another embodiment is shown in FIG. 7. The connection base 4' comprises a third installation flange 41' and an auxiliary insulation tube which are monolithically formed in a single piece. The auxiliary insulation tube includes a first tube portion 42a, a second tube portion 42c, and a third tube portion 42b. The first tube portion 42a is located at one end of the auxiliary insulation tube proximal to the third installation flange 41'. The second tube portion 42c is located at the other end of the auxiliary insulation tube distal from the third installation flange 41'. The third tube portion 42b is located between the first tube portion 42a and the second tube portion 42c. The first tube portion 42a has a constant first outer diameter, the second tube portion 42c has a constant second outer diameter less than the first outer diameter, and the third tube portion 42b has a third outer diameter gradually decreasing from the first outer diameter to the second outer diameter.

The second tube portion 42c of the auxiliary insulation tube of the connection base 4' shown in FIG. 7 is inserted into and connected to the inlet end of the insulation tube 1. In an embodiment, the second tube portion 42c is threaded to the insulation tube 1. The connection base 4' further comprises a plurality of insulation reinforcing ribs 43' integrally formed with the third installation flange 41' and the auxiliary insulation tube 42'. A plurality of installation holes 41a are formed in and extend through the third installation flange 41'. The third installation flange 41' is connected to the annular bottom plate 2 by a plurality of bolts extending through the installation holes 41a.

With the connection base 4', the insulation tube 1 is mated with the second tube portion 42c with a smaller diameter, instead of being mated with the third installation flange 41' with a larger diameter. The diameter of the insulation tube 1 is thereby reduced, decreasing the amount of material and cost for manufacturing the insulation tube 1.

An inner diameter of the first tube portion 42a of the auxiliary insulation tube 42' is larger than an inner diameter of the second tube portion 42c of the auxiliary insulation tube 42'. The electric field is relatively concentrated at the first tube portion 42a of the auxiliary insulation tube 42', improving the insulation efficiency and reducing the cost because the entire auxiliary insulation tube 42' and the insulation tube 1 do not need to have the same diameter. An inner diameter of the insulation tube 1 is slightly larger than the outer diameter of the second tube portion 42c of the auxiliary insulation tube 42' and less than the outer diameter of the first tube portion 42a of the auxiliary insulation tube 42'. The inlet end of the insulation tube 1 is sleeved and connected to the outer wall of the second tube portion 42c of the auxiliary insulation tube 42'.

In an embodiment, the connection base 4' and the insulation tube 1 are made of the same insulation material and the connection base 4' and the insulation tube 1 have the same thermal expansion coefficient. Thereby, a gap does not form between the connection base 4' and the insulation tube 1. In another embodiment, the connection base 4' may be made of metal.

In an embodiment, the insulation tube 1 is formed by winding glass fiber impregnated with epoxy resin. The connection base 4' may be a pressed piece made of glass fiber impregnated with epoxy resin. In an embodiment, the inlet end of the insulation tube 1 may be wrapped and sealed onto the second tube portion 42c of the auxiliary insulation tube 42', so as to form a whole sealing structure and improve the seal performance of the insulation termination assembly 100.

Figure 8:
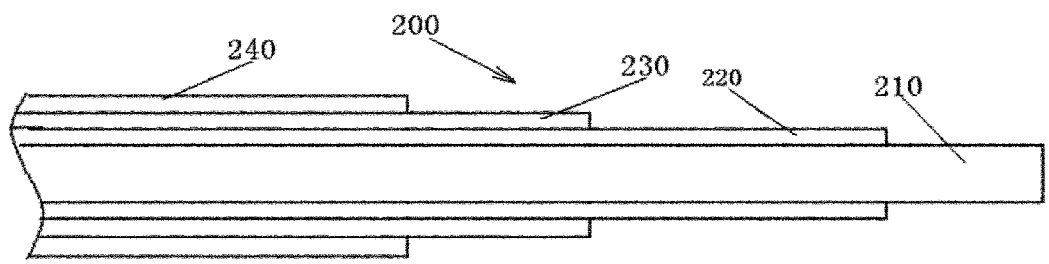
FIG. 8 is a sectional side view of a cable joint of a cable.

The cable 200, as shown in FIG. 8, has a cable joint at a connection end of the cable 200. The cable joint includes a conductor core 210, an inner insulation layer 220 covered on the conductor core 210, a conductive shielding layer 230 covered on the inner insulation layer 220, and an outer sheath layer 240 covered on the conductive shielding layer 230. Before connecting the cable joint, a section of outer sheath layer 240 is removed from the connection end of the cable to be connected to expose a section of conductive shielding layer 230. Then, a portion of the exposed conductive shielding layer 230 is removed to expose a section of inner insulation layer 220. Finally, a portion of the exposed inner insulation layer 220 is removed to expose a section of conductor core 210 and form the cable joint.

The insulation termination assembly 100, as shown in FIG. 1, comprises a support seat 5 and a stress control cone 6 made of a rubber material. The support seat 5 is mounted on a side of the annular bottom plate 2 opposite to the tail assembly 3 and extends into the inner space 12 of the insulation tube 1. The stress control cone 6 is mounted on the support seat 5. The stress control cone 6 is sheathed at least on a cut end of the conductive shielding layer 230 and a location of the inner insulation layer 220 adjacent to the cut end of the conductive shielding layer 230. The stress control cone 6 prevent charges from being concentrated at the location of the inner insulation layer 220 adjacent to the cut end of the conductive shielding layer 230, and may protect the insulation tube 1 from charge breakdown.

As shown in FIGS. 1 and 3, in an embodiment, the insulation termination assembly 100 further comprises a conductive output bar 7. The conductive output bar 7 has a first end 71 extending out of the insulation tube 1 and a second end 72 inserted into the insulation tube 1 and connected to the first end 71. The second end 72 is located in the inner space 12 of the insulation tube 1. The second end 72 of the conductive output bar 7 has a slot 721. The conductor core 210 of the cable 200 is inserted into and engaged to the slot 721. The conductor core 210 is inserted into the slot 721 in an interference-fit so as to ensure a stable electrical connection between the conductor core 210 and the second end 72. A fixation member 9 is crimped on a joint of the conductor core 210 and slot 721 to further ensure the electric connection between the conductor core 210 and the second end 72.

In the embodiment shown in FIGS. 1 and 3, the insulation termination assembly 100 further comprises a high voltage shielding ring 8 detachably mounted on the outer wall of the outlet end of the insulation tube 1 and surrounding the first end 71 of the conductive output bar 7. The high voltage shielding ring 8 is used to uniform the electric field produced at the first end 71 of the conductive output bar 7 to prevent a concentrated discharge.

What is claimed is:

1. An insulation termination assembly, comprising:
   an insulation tube having an inlet end, an outlet end opposite to the inlet end, and an inner space filled with an insulation liquid;
   an annular bottom plate mounted at the inlet end of the insulation tube; and
   a tail assembly comprising:
   an insulation connection tube mounted on the annular bottom plate; and
   a shield tail tube connected to the insulation connection tube, a cable joint of a cable is introduced into the inner space of the insulation tube from the inlet end of the insulation tube after passing through the shield tail tube and the insulation connection tube.

2. The insulation termination assembly of claim 1, wherein the insulation connection tube includes:
   an inner tube;
   an outer tube provided outside the inner tube; and
   a connection part connected between an end of the inner tube and an end of the outer tube.

3. The insulation termination assembly of claim 2, wherein the shield tail tube has an installation end disposed between the inner tube and the outer tube of the insulation connection tube, the installation end connected to the connection part of the insulation connection tube.

4. The insulation termination assembly of claim 3, wherein the installation end of the shield tail tube has a first installation flange protruding radially outward and the shield tail tube is mounted to the connection part by a plurality of first connection pieces extending through a plurality installation holes in the first installation flange.

5. The insulation termination assembly of claim 4, further comprising a first seal pad disposed between the installation end of the shield tail tube and the connection part of the insulation connection tube.

6. The insulation termination assembly of claim 3, wherein the connection part of the insulation connection tube radially protrudes outward beyond the outer tube of the insulation connection tube to form a second installation flange mounted on the annular bottom plate.

7. The insulation termination assembly of claim 6, further comprising a second seal pad disposed between the second installation flange and the annular bottom plate.

8. The insulation termination assembly of claim 1, wherein the shield tail tube has a grounding part configured to connect to a grounding wire.

9. The insulation termination assembly of claim 1, further comprising a connection base mounted at the inlet end of the insulation tube, the annular bottom plate mounted on a bottom of the connection base.

10. The insulation termination assembly of claim 9, wherein the connection base has a third installation flange and an auxiliary insulation tube monolithically formed in a single piece, the auxiliary insulation tube connected to the inlet end of the insulation tube and the annular bottom plate mounted on the third installation flange.

11. The insulation termination assembly of claim 10, wherein the connection base has a plurality of insulation reinforcing ribs integrally formed with the third installation flange and the auxiliary insulation tube, the plurality of insulation reinforcing ribs each connected to a surface of the third installation flange and an outer wall of the auxiliary insulation tube.

12. The insulation termination assembly of claim 10, wherein the auxiliary insulation tube includes:
   a first tube portion located at a first end of the auxiliary insulation tube adjacent to the third installation flange and having a constant first outer diameter;
   a second tube portion located at a second end of the auxiliary insulation tube opposite the first end and the third installation flange and having a constant second outer diameter less than the first outer diameter; and
   a third tube portion located between the first tube portion and the second tube portion having a third outer diameter gradually decreasing from the first outer diameter to the second outer diameter.

13. The insulation termination assembly of claim 12, wherein an inner diameter of the insulation tube is slightly larger than the second outer diameter of the second tube portion and is less than the first outer diameter of the first tube portion.

14. The insulation termination assembly of claim 13, wherein the inlet end of the insulation tube is sleeved and connected to an outer wall of the second tube portion.

15. The insulation termination assembly of claim 14, wherein the connection base and the insulation tube are made of a same insulation material.

16. The insulation termination assembly of claim 1, wherein the cable joint includes a conductor core, an inner insulation layer covered on the conductor core, a conductive shielding layer covered on the inner insulation layer, and an outer sheath layer covered on the conductive shielding layer.

17. The insulation termination assembly of claim 16, further comprising:
   a support seat mounted on a side of the annular bottom plate opposite the tail assembly and extending into the inner space of the insulation tube; and
   a stress control cone mounted on the support seat and sheathed at least on a cut end of the conductive shielding layer and the inner insulation layer adjacent to the cut end of the conductive shielding layer.

18. The insulation termination assembly of claim 17, further comprising a conductive output bar including a first end extending out of the insulation tube and a second end inserted into the insulation tube and connected to the first end, the second end of the conductive output bar has a slot and the conductor core of the cable is adapted to be inserted into and engaged in the slot.

19. The insulation termination assembly of claim 18, further comprising a high voltage shielding ring detachably mounted on an outer wall of the outlet end of the insulation tube and surrounding the first end of the conductive output bar.

20. The insulation termination assembly of claim 1, wherein the insulation tube is formed by winding a glass fiber impregnated with an epoxy resin.

\* \* \* \* \*